United States Patent [19]
Zdanowski

[11] 3,785,860
[45] *Jan. 15, 1974

[54] FLOOR POLISHING METHOD AND ARTICLE

[75] Inventor: Richard E. Zdanowski, Fort Washington, Pa.

[73] Assignee: Rohm and Haas Company, Philadelphia, Pa.

[ * ] Notice: The portion of the term of this patent subsequent to Mar. 30, 1988, has been disclaimed.

[22] Filed: Mar. 8, 1971

[21] Appl. No.: 122,245

Related U.S. Application Data

[60] Division of Ser. No. 640,851, May 24, 1967, Pat. No. 3,573,239, which is a continuation-in-part of Ser. No. 455,609, May 13, 1965, abandoned, which is a continuation-in-part of Ser. No. 98,744, March 28, 1961, abandoned.

[52] U.S. Cl. 117/138.8 UN, 117/161 UN, 117/161 UZ
[51] Int. Cl. .................... B32b 37/08, B44d 5/00
[58] Field of Search................... 117/138.8, 161; 106/8, 10; 260/24, 28.5, 862, 873

[56] References Cited
UNITED STATES PATENTS

| | | | |
|---|---|---|---|
| 3,328,325 | 6/1967 | Zdanowski | 260/27 X |
| 2,971,934 | 2/1961 | Brown et al. | 260/27 X |
| 3,061,564 | 10/1962 | Zdanowski et al. | 260/27 |
| 3,253,941 | 5/1966 | Finn et al. | 117/6 |
| 3,573,239 | 3/1971 | Zdanowski | 260/24 X |

Primary Examiner—William D. Martin
Assistant Examiner—Sadie L. Childs
Attorney—Robert A. Doherty, George W. F. Simmons and Carl A. Castellan

[57] ABSTRACT

This invention relates to methods of using coating compositions, and especially to floor polishing compositions, which are particularly suitable for applying glossy finishes on wood, rubber, glass, tile and linoleum surfaces, either with or without paint or varnish finishes, and to the resulting article. These compositions adapted to be used for polishing floors, furniture, and the like, are formed of an aqueous dispersion having a pH of at least 7.0 and containing, as essential components, water, a wax, a water-insoluble linear polymer of monoethylenically unsaturated molecules, and a dispersing agent in a proportion from 0.1 to 20 percent by weight, based on the total weight of polymer and wax, any content of alkali-soluble resin being not over 50 percent by weight, based on the weight of the polymer, any alkali-soluble resin, if present, preferably being selected from the group consisting of shellac, Manila gum, Loba gum and alkali-soluble alkyds or polyesters, the improvement consisting in using for essentially the entire weight of the polymer, A. a water-insoluble linear copolymer of
  I. 10 to 55 percent by weight of at least one nitrile of acrylic or methacrylic acid, and
  II. 45 to 90 percent by weight of at least one ester of (a) acrylic acid with a saturated aliphatic alcohol having one to 18 carbon atoms or (b) methacrylic acid with n-butanol or a saturated aliphatic alcohol having five to 18 carbon atoms, the sum of the proportions of (I) and (II) totaling 100 percent, or B. a water-insoluble linear copolymer of
  1. 10 to 55 percent by weight of at least one nitrile of acrylic or methacrylic acid,
  2. 20 to 60 percent by weight of at least one ester of acrylic or methacrylic acid with a saturated aliphatic alcohol having one to 18 carbon atoms,
  3. 0 to about 60 percent by weight of at least one other water-insoluble monomer selected from the group consisting of vinyl acetate, styrene, vinyltoluene, vinyl chloride, and vinylidene chloride, and
  4. a. ½ to 15 percent by weight of acrylic acid, methyacrylic acid or itaconic acid in the form of amine, ammonium or alkali-metal salt, or
     b. 4 to 15 percent by weight of at least one monomer containing an amine group, the sum of the proportions of (1), (2), (3) and (4) totaling 100 percent, the components of the copolymer being such that a film formed thereof has a KHN of about 2 to 20, and providing in the composition a weight ratio of copolymer to wax between 95:5 to 10:90.

3 Claims, No Drawings

FLOOR POLISHING METHOD AND ARTICLE

The present application is a division of Ser. No. 640,851, filed May 24, 1967, now U.S. Pat. No. 3,573,239, which is a continuation-in-part of my co-pending application Ser. No. 455,609, filed May 13, 1965, which is in turn a continuation-in-part of Ser. No. 98,744, filed Mar. 28, 1961, both now abandoned.

Copolymers of styrene and acrylic esters and blends of polymers of acrylic acid esters and methacrylic acid esters have been recommended as a component in wax floor polishing compositions. However, it has been found that all those compositions, as well as those comprising wax and polyacrylic acid ester emulsion polymers, suffer from migration of plasticizer from many types of floor tiles to which it is the conventional practice to apply floor polishes of the type mentioned. This migration causes softening of the polish with the development of tackiness, messy appearance, severe tendency to pick up dirt, and poor protection of the flooring material from abrasion and wear. Plasticizer migration also makes removal of the polish very difficult—it gets imbedded in the tile.

In accordance with the present invention, it has been found that the inclusion of a substantial amount of acrylonitrile or methacrylonitrile in an acrylic ester polymer serves to greatly reduce or completely eliminate the tendency of plasticizers to migrate from the substrate to the polish thereon.

The emulsion copolymers useful in the present invention are formed by the copolymerization of a mixture of 10 to 55 percent by weight of at least one nitrile of an acid of the formula

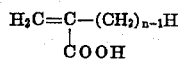

in which $n$ is an integer having a value of 1 to 2, with 30 to 90 percent by weight of at least one ester of an acid of the aforesaid formula with a saturated aliphatic alcohol having from one to 18 carbon atoms and preferably with an alkanol having one to four carbon atoms. Examples of the esters include methyl acrylate and methacrylate, ethyl acrylate and methacrylate, butyl acrylate and methacrylate, 2-ethylhexyl acrylate and methacrylate, lauryl acrylate and methacrylate, and stearyl acrylate and methacrylate.

The copolymer may be composed entirely of the nitrile and an acrylic acid ester component; it may consist entirely of the nitrile and methacrylic acid ester or esters when these esters are formed of n-butanol or alcohols having at least five carbon atoms. However, the relative proportions between the nitrile and ester components should be so chosen that a film formed from the copolymer alone has a Knoop hardness number (KHN) between 2 and 20 when measured on a film of 0.5 to 2.5 mil thickness on a glass panel. Besides these two essential components, the copolymer may contain up to 60 percent by weight of other copolymerized units derived from other water-insoluble monomers contributing more or less hardness to the copolymer provided the resulting copolymer deposits a film having a KHN in the range stated. Examples of these comonomers include vinyl acetate, $(C_1-C_3)$-alkyl methacrylates, such as methyl, ethyl, or propyl methacrylate, sec-butyl methacrylate, tert-butyl methacrylate, styrene, vinyltoluene, vinyl chloride, and vinylidene chloride. The copolymers may also contain about ½ percent up to 12 percent and even up to 15 percent by weight of monomers containing acid groups (or alkali metal, ammonium or volatile amine salts thereof) or up to 15 percent by weight of amine groups (in free amine or salt form). For example, 3 to 12 percent by weight of acrylic acid, methacrylic acid, itaconic acid or other acid may be used to facilitate removal of the floor polish by means of dilute alkaline detergents. Similarly, a content of a vinylpyridine, a dimethylaminoethyl acrylate or methacrylate, a tert-butylaminoethyl acrylate or methacrylate, a dimethylaminoethyl vinyl ether or sulfide, or an N-dimethylaminoethyl acrylamide or methacrylamide, or an aminoalkyl $(C_2-C_{10})$ vinyl ether or sulfide, such as 2-aminoethyl vinyl ether, may be introduced into the polymer or polymers of the composition of the present invention to facilitate removal of the polish by means of dilute acid solutions, such as vinegar.

Preferred copolymers are those of 20 to 45 percent by weight of acrylonitrile, 30 to 60 percent by weight of a $(C_1-C_4)$ alkyl acrylate (e.g., ethyl acrylate) and 10 to 40 percent by weight of one or more monomers selected from the group consisting of methyl methacrylate, vinyl acetate, styrene, and vinyltoluene, and either (1) ½ to 12 percent of a monomer containing a carboxylate group or (2) 4 to 12 percent of a monomer containing an amine group.

Blends of emulsion copolymers may, of course, be used to provide an average composition within the overall limits specified herein.

The floor polishing compositions useful in practicing the present invention comprise an aqueous dispersion of an emulsifying and/or dispersing agent, a wax, and at least one acrylic ester/nitrile emulsion copolymer as defined hereinabove. The relative proportions of the polymer to wax are from 95:5 to 10:90 by weight and preferably are about 40:60 to 95:5. The variation in these relative proportions provides for various buffing characteristics. The amount of an emulsifying or dispersing agent or agents is generally from 0.1 to 10 percent or even up to 20 percent, and preferably 2 to 12 percent, and most preferably 2 to 8 percent of the combined weights of the copolymer and wax. The concentration of the aqueous polish composition may be from 8 to 25 percent solids and is preferably about 10 to 20 percent by weight of solids. The composition should have a pH of at least about 7.5 and it may be as high as 9.5 or more. In no event is it allowed to be lower than 7.0. A suitable alkaline or buffering agent, such as borax, sodium hydroxide, ammonia, or amines, may be introduced to adjust the pH to the desired value.

The copolymer is preferably made by the emulsion copolymerization of the several monomers in the proper proportions. Thus the monomers may be emulsified with an anionic, a cationic, or a non-ionic dispersing agent, about ½ percent to 6 percent, preferably 1 to 6 percent, thereof being used on the weight of total monomers. The acid or amine monomer, if used, is of course, soluble in water so that the dispersing agent serves to emulsify the other two monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalysts, may be used in proportions of ½ to 2 percent each based on the weight of monomers to be copolymerized. The temperature may be from room temperature to 60° C. or more as is conventional. Suitable anionic dispersing agents include the sodium salts of the higher fatty acid sulfates, such as that of lauryl alcohol, the higher fatty acid salts, such as the oleates or stearates of morpholine, triethanolamine or mixed ethanolamines, or any of the non-ionic types, such as ethylene oxide modified alkyl phenols, of which tert-octyl phenol modified by 20 to 40 ethylene oxide units is representative, ethylene oxide-modifed higher fatty alcohols, such as lauryl alcohol, containing 20 to 50 ethylene oxide units, similarly modified long-chain mercaptans, fatty acids, amines, or the like.

When the wax is separately dispersed, the dispersing agents mentioned above may similarly be used, but amine salts of soap, such as an ethanolamine oleate or stearate, are most useful. Suitable homogenizing mills may be used for assisting the dispersion.

The waxes or mixtures of waxes which may be used include waxes of a vegetable, animal, synthetic, and/or mineral origin, or mixtures thereof, such as carnauba, candelilla, montan, lanoline, cocoa butter, cottonseed, stearin, Japan wax, bayberry, myrtle, mace, palm kernel, beeswax, spermaceti, Chinese insect, mutton tallow, polyethylene, polypropylene, waxes obtained by the hydrogenation of coconut oils or soybean oils, and the mineral waxes such as paraffin, ceresin, montan, ozokerite, etc.

The compositions are adapted to form clear glossy coatings. However, if desired, a translucent appearance or an opaque or colored appearance may be obtained by the introduction of dulling agents, water-soluble or oil-soluble dyes, pigments or fillers in suitable proportions. Examples of suitable water-insoluble pigments which may be used include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

The amount of pigment may be varied widely, depending on the effect desired. The amount of pigment, by weight based on the weight of the organic film-forming material, may vary between about 2 percent for light, high-hiding pigments such as carbon black and about 100 percent for heavy, low-hiding pigments such as lead chromate.

The aqueous polish compositions may contain a plasticizer whenever it is necessary in a particular application, to provide a lower temperature of film formation from the emulsion polymer dispersions. From 10 to 45 percent, preferably 15 to 30 percent, by weight of the plasticizer, based on the weight of copolymer, is quite practical.

Since the purpose of the plasticizer is usually to facilitate film formation, and since it is not always necessary to impart flexibility to the copolymer composition when it is inherently tough and flexible, as is often the case, a fugitive or semi-fugitive plasticizer is preferred rather than a permanent plasticizer. However, permanent plasticizers may be used without the production of films having poor wear-resistance and poor resistance to water since the proportion of plasticizer introduced is relatively small, being not over about 45 percent by weight of the copolymer solids. Certain plasticizers, such as tributoxyethyl phosphate, serve also as leveling agents.

Examples of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, butyl cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl fulfonamide, the di-2-ethylhexyl ester of hexamethylene glycol diphthalate, di-(methylcyclohexyl)phthalate, tributoxyethyl phosphate, tributyl phosphate. The particular plasticizer and the amount thereof used are chosen in accordance with the demand for compatibility and efficiency in lowering the film forming temperature.

Besides containing the copolymer, the wax, and a suitable dispersing or emulsifying agent and the optional pigments and fillers mentioned hereinabove, the compositions may also contain other ingredients such as wax-soluble resins or gums or alkali-soluble resins in an amount of 1 percent to 50 percent, and preferably 5 to 35 percent, by weight, based on the weight of the copolymer. Examples of the wax-soluble materials include terpene-phenolic resins, heat process ("run") Congo, wood rosin, oxidized petroleum wax, and so on.

Examples of alkali-soluble resins include shellac, Manila gum, Loba gum, and alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids, such as abietic or rosin. The resins disclosed in U. S. Pat. No. 2,063,542 may be used. These resins have acid numbers of about 100 to 145. Examples of the dicarboxylic acids include maleic, fumaric, adipic, sebacic, including anhydrides thereof. The polyhydric alcohols may be glycerol, pentaerythritol, trimethylol-ethane, and glycols having two to eight carbon atoms including diethylene glycol and triethylene glycol. In such compositions the amount of dispersing or emulsifying agent or agents may be from 3 to 8 percent of the combined weights of copolymer and wax. The concentration of the polish composition for application purposes may desirably be from 8 to 25 percent solids and is preferably from about 10 to 20 percent by weight of solids.

The compositions may be used for impregnating textiles, leather, paper, or other porous or fibrous materials. They may also be applied to plastic sheets such as cellophane, polyethylene, polyethylene glycol terephthalate, saran, and the like. They may also be applied to rigid surfaces, including all sorts of metals such as steel, aluminum, copper, brass, bronze, tin, chromium, and wrought iron, and to wood, stone, masonry, brick, glass, asbestos cement shingles or siding, terrazzo, cement and concrete surfaces such as floors, and so on.

In floor polishing compositions, the proportions of the main ingredients should be:

| Constituent | Proportion |
|---|---|
| A. Copolymer | 10–95 parts by weight |
| B. Wax | 5–90 parts by weight |
| C. Alkali-soluble resin | 0–40 parts by weight |
| D. Wetting, emulsifying and dispersing agents | 0.5% to 20%, preferably 0.5 to 8%, by weight, based on the total weight of A + B + C |
| E. Water | To make total solids of 8% to 25% |

For a non-buffable, self-polishing composition, the wax should be not over 35 parts by weight, preferably five to 25 parts by weight in the formulation of the above table. For a buffable composition, the wax should be at least 35 parts by weight. Examples of wetting and dispersing agents include alkali metal and amine salts of higher fatty acids having 12 to 18 carbon atoms, such as sodium, potassium, ammonium, or morpholine oleate or ricinoleate, as well as the common non-ionic surface active agents. Additional wetting agent improves the spreading action of the polish.

For polishing floors, the coating obtained from the composition comprising the copolymer and the wax should have a Knoop hardness number of 0.5 to 15 when measured on a film thereof 0.5 to 2.5 mil thick on glass. This range of hardness provides good resistance to abrasion and wear and can be obtained by the appropriate selection of comonomers to be copolymerized.

The copolymer and wax (and resin when used) may be mixed in any order desired. For example, the wax or resin or both may be introduced into the aqueous polymer dispersion by adding a dispersion of the wax or resin or both to the copolymer dispersion or vice-versa. Preferably, the copolymer is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate, are quite useful. Besides incorporating wax in floor polishing compositions, an additional plasticizer or a fugitive fluxing aid may be used to reach the desired minimum film-forming temperature of the composition.

In the compositions intended to be removed only by acid, it is generally the rule that no alkali-sensitive material such as an alkali-soluble resin should be employed. However, with the amine-containing copolymers of the present invention, it has been found that even though an alkali-soluble resin is present in substantial amounts, coatings therefrom having hardness in the range of 0.5 to 15 (Knoop hardness number) can be washed with soaps and alkaline detergents without a requirement of excessive care to prevent damage by partial or complete removal of the coating. However, it is preferred that the amount of alkali-soluble resin be less than 20 percent by weight of the total of polymer and wax solids in these acid-removable compositions.

The compositions have good storage stability under normal conditions of temperature. They may be applied in the usual manner by means of wiping cloths, by brushing, or by means of mops. They dry rapidly to clear or colored films, if pigmented, having hard and tough glossy surfaces. There is substantially no discoloration of the films on aging. The compositions containing copolymers having carboxylate (acid or salt) groups are removable by dilute alkaline detergents. On the other hand, the compositions containing copolymers having amino groups are resistant to cleaning with soapy solutions or alkaline solutions such as dilute aqueous ammonia whenever it is necessary to clean the surfaces. These coatings, however, are readily removed with dilute aqueous acid solutions such as those containing from ½ to 5 percent by weight of acetic acid, boric acid, or phosphoric acid, whenever it is necessary, either because of accumulation of dirt or because of the need to paint or varnish the base surfaces, for such removal.

The following examples in which the parts and percentages are by weight unless otherwise indicated are illustrative of the invention.

EXAMPLE 1 a. An emulsion copolymer was prepared with the following weight percent composition employing 3 percent sodium lauryl sulfate (based on total weight of the monomers) as the emulsifier and conventional emulsion polymerization technique:

ethyl acrylate — 40%
methyl methacrylate — 23%
acrylonitrile — 30%
methacrylic acid — 7%

The final polymer solids concentration of the emulsion was 45.1 percent. The emulsion was diluted with water to 15 percent polymer solids.

b. A mixture of 40 parts by weight of emulsifiable low molecular weight polyethylene melting at about 75° C. and 8 parts by weight of oleic acid was melted and 8 parts by weight of morpholine was added to the mixture. The complete melt was added slowly to 184 parts by weight of water heated to 205° F. while under vigorous agitation. The emulsion was allowed to cool and was then diluted to 15 percent solids.

c. Ten parts by weight of ammonia-soluble resin-maleic type adduct partially esterified with a polyhydric alcohol sold by the Rohm and Haas Company under the trademark AMBEROL 750 was added to 56.5 parts by weight of water containing 1.4 part by weight of 28 percent $NH_4OH$ solution and maintained at 50° C. The resulting solution was filtered.

d. Seventy-two and a half parts of the polymer dispersion in part (a) was mixed with 11 parts by weight of wax emulsion from part (b) and 16.5 parts by weight of AMBEROL 750 solution from part (c). The resulting mixture was further modified by the addition of 1 part by weight of tributoxyethyl phosphate and 1½ parts by weight of ethylene glycol monoethyl ether. The pH of the final formulation was adjusted to 9.2 with morpholine.

The coating composition was quite stable on storing. When applied to linoleum, asphalt, vinyl asbestos and vinyl tile surfaces, it leveled well and dried rapidly. Both latter tile substrates contained up to 25 percent by weight of dipropylene glycol dibenzoate as plasticizer which is generally recognized to be susceptible to excessive penetration into a variety of floor polishes. The resulting floor polish coating was characterized by a high degree of toughness, excellent initial gloss and excellent retention of gloss after submission to extensive foot traffic. The coating was found to show no water-spotting when exposed to water for 1 hour after a 4 hour dry at 25° C. There was no evidence of any plasticizer migration into the floor polish on any of the floor substrates under test.

When the same composition is produced from a copolymer of 40 parts of ethyl acrylate, 53 parts of methyl methacrylate, and 7 parts of methacrylic acid, the floor finish was of poor quality and softened excessively becuase of plasticizer migration.

EXAMPLES 2–15

Example 1 was repeated with similar results substituting mixtures of the following monomers for the monomers in part (a) of Example 1:

Key:
EA is ethyl acrylate
MMA is methyl methacrylate
AN is acrylonitrile
MAA is methacrylic acid

| Example No. | Composition (%) | | | | Other |
|---|---|---|---|---|---|
| | EA | MMA | AN | MAA | |
| 2 | 30 | 24.5 | 45 | 0.5 | — |
| 3 | 40 | 28 | 25 | 7 | — |
| 4 | 60 | — | 30 | 5 | 5 Styrene |
| 5 | 39.5 | 40 | 20 | 0.5 | — |
| 6 | 40 | — | 30 | 7 | 23 Styrene |
| 7 | 48 | — | 35 | 7 | 10 Styrene |
| 8 | 50 | — | 28 | 12 | 10 Vinyltoluene |
| 9 | — | 20 | 45 | 5 | 30 Butyl acrylate |
| 10 | 40 | 13 | 35 | 7 | 5 Styrene |
| 11 | 40 | 15 | 35 | — | 10 Dimethylaminoethyl methacrylate |
| 12 | 40 | 11.5 | 30 | 7 | 11.5 Vinylidene chloride |
| 13 | 41 | — | 17 | 2 | 40 Vinyl acetate |
| 14 | 50 | 3 | 30 | 7 | 10 Styrene |
| 15 | 40 | 8 | 30 | 7 | 10 Styrene and 5 n-hexyl acrylate |

I claim:

1. A method of polishing a floor covering having migratable plasticizer therein, and preventing plasticizer migration comprising the steps of coating the floor with an aqueous dispersion having an alkaline pH and containing, as essential components, water, a wax, a water-insoluble linear polymer of monoethylenically unsaturated molecules, and a dispersing agent in a proportion from 0.1 to 20 percent by weight, based on the total weight of polymer and wax, any content of alkali-soluble resin being not over 50 percent by weight, based on the weight of the polymer, said polymer being:

A. a water-insoluble linear copolymer of
   I. 10 to 55 percent by weight of at least one nitrile of acrylic or methacrylic acid, and
   II. 45 to 90 percent by weight of at least one ester of (a) acrylic acid with a saturated aliphatic alcohol having one to 18 carbon atoms or (b) methacrylic acid with n-butanol or a saturated aliphatic alcohol having five to 18 carbon atoms, the sum of the proportions of (I) and (II) totaling 100 percent,
   or
   B. a water-insoluble linear copolymer of
   1. 10 to 55 percent by weight of at least one nitrile of acrylic or methacrylic acid,
   2. 20 to 60 percent by weight of at least one ester of acrylic or methacrylic acid with a saturated aliphatic alcohol having one to 18 carbon atoms,
   3. 0 to about 60 percent by weight of at least one other water-insoluble monomer selected from the group consisting of vinyl acetate, styrene, vinyltoluene, vinyl chloride, and vinylidene chloride, and
   4. a. ½ to 15 percent by weight of acrylic acid, methacrylic acid or itaconic acid in the form of amine, ammonium or alkali-metal salt or
      b. 4 to 15 percent by weight of at least one monomer containing an amine group, the sum of the proportions of (1), (2), (3), and (4) totaling 100 percent, the components of the copolymer being such that a film formed thereof has a KHN of about 2 to 20, the weight ratio of copolymer to wax being between 95:5 to 10:90, and drying said coating.

2. The method of claim 1 in which the floor covering is a vinyl tile.

3. The article prepared by the method of claim 2.

* * * * *